(12) United States Patent
Bambeck et al.

(10) Patent No.: US 11,560,735 B2
(45) Date of Patent: Jan. 24, 2023

(54) CONTAINER DEVICE FOR STORING AN IDENTIFICATION DEVICE, INSERT FOR STORING AN IDENTIFICATION DEVICE AND PROCESS FOR OPERATING AN IDENTIFICATION DEVICE

(71) Applicant: Liberkee GmbH, Velbert (DE)

(72) Inventors: Daniel Bambeck, Essen (DE); Stefan Schiemann, Cologne (DE); Sven Gennermann, Velbert (DE); Robin Neitzel, Bochum (DE)

(73) Assignee: LIBERKEE GMBH, Velbert (DE)

( * ) Notice: Subject to any disclaimer, the term of this patent is extended or adjusted under 35 U.S.C. 154(b) by 529 days.

(21) Appl. No.: 16/610,189

(22) PCT Filed: May 29, 2018

(86) PCT No.: PCT/EP2018/064083
§ 371 (c)(1),
(2) Date: Nov. 1, 2019

(87) PCT Pub. No.: WO2018/219957
PCT Pub. Date: Dec. 6, 2018

(65) Prior Publication Data
US 2020/0115924 A1    Apr. 16, 2020

(30) Foreign Application Priority Data
May 31, 2017    (DE) .................... 10 2017 112 007.6

(51) Int. Cl.
*E05B 19/00*      (2006.01)
*G08C 17/02*      (2006.01)
(Continued)

(52) U.S. Cl.
CPC ............ *E05B 19/0005* (2013.01); *B60R 7/04* (2013.01); *E05F 15/614* (2015.01);
(Continued)

(58) Field of Classification Search
CPC ...... E05B 19/0005; E05F 15/614; B60R 7/04; G07C 9/00571; G07C 9/00912; G07C 9/29; G08C 17/02; A45C 11/32; A47G 29/10
See application file for complete search history.

(56) References Cited

U.S. PATENT DOCUMENTS 5,520,313 A * 5/1996 Toshihide .............. B60N 3/102
224/280
5,887,929 A * 3/1999 Miller ...................... B60R 7/04
296/37.7
(Continued)

FOREIGN PATENT DOCUMENTS

CN    10 1218405    7/2008
CN    10 3688296    3/2014
(Continued)

OTHER PUBLICATIONS

English translation of EP 1808336A1 (Year: 2007).*
(Continued)

*Primary Examiner* — Yong Hang Jiang
(74) *Attorney, Agent, or Firm* — Jacobson Holman PLLC

(57) ABSTRACT

A container device for storing an identification device in a vehicle includes a key compartment with a cavity in which the identification device can be stored. An insert can store the identification device in the cavity of the container device. A container system and a method of actuating the identification device are provided.

28 Claims, 7 Drawing Sheets

(51) Int. Cl.
  *B60R 7/04* (2006.01)
  *E05F 15/614* (2015.01)
  *G07C 9/00* (2020.01)
  *E05B 47/00* (2006.01)

(52) U.S. Cl.
  CPC ..... *G07C 9/00571* (2013.01); *G07C 9/00912* (2013.01); *G08C 17/02* (2013.01); *E05B 47/0001* (2013.01)

(56) References Cited

U.S. PATENT DOCUMENTS

| | | | |
|---|---|---|---|
| 2016/0358395 A1 | 12/2016 | Dry | |
| 2017/0282810 A1* | 10/2017 | Parra Becerra | B65D 21/086 |
| 2020/0054106 A1* | 2/2020 | Arai | G07C 9/00571 |
| 2020/0115924 A1* | 4/2020 | Bambeck | B60R 7/04 |

FOREIGN PATENT DOCUMENTS

| | | | | |
|---|---|---|---|---|
| DE | 10 2005 030 081 | | 1/2007 | |
| DE | 102005059061 | | 6/2007 | |
| DE | 102012015925 | | 3/2014 | |
| DE | 10 2013 002 281 | | 8/2014 | |
| EP | 1808336 | | 7/2007 | |
| JP | 2019512630 A | * | 5/2019 | ......... G07C 9/00896 |
| WO | WO 2017/168341 | | 10/2017 | |

OTHER PUBLICATIONS

English translation of DE102012015925A1 (Year: 2014).*
Chines Office Action.
European Office Action dated Mar. 17, 2022.
Chinese Office Action dated Jan. 7, 2022.

* cited by examiner

CONTAINER DEVICE FOR STORING AN IDENTIFICATION DEVICE, INSERT FOR STORING AN IDENTIFICATION DEVICE AND PROCESS FOR OPERATING AN IDENTIFICATION DEVICE

BACKGROUND OF THE INVENTION

1. Field of the Invention

The invention relates to a container device for storing an identification device in a vehicle according to the generic term of claim 1, an insert for storing an identification device in a cavity of a container device according to the generic term of claim 13, a container system, and a method for operating an identification device according to the independent method claim.

2. Description of Related Art

It is well known that car sharing is becoming increasingly popular, especially in large cities. In car sharing, vehicles are made available by a car sharing provider, which a user can borrow, for example, to cover a certain distance or perform a certain task, such as shopping. The user then parks the vehicle so that it is available for the next user.

It is currently common for the key to be located in the glove compartment of a car-sharing vehicle, for example, and for a user to receive an online code to access the vehicle via his mobile phone in order to be able to open it. As soon as he has gained access to the vehicle, he reaches into the glove compartment and uses the key in it, in which he is also to store the key again after use. This ensures that the next user will also find the key there. However, it may be that the vehicle key is consciously or unconsciously taken along. Furthermore, the key is accessible to a burglar, for example, if unauthorized access to the vehicle is gained, for example by smashing a window, so that it is easy for the burglar to also overcome the immobilizer with the key located in the glove compartment.

Another problem is that individual solutions for each user's access to the immobilizer, e.g. code provided by the car sharing provider, would often require major vehicle conversions. Larger conversions can be, for example, the installation of a special locking system for car sharing operation. Usually, however, car-sharing vehicles are often production vehicles that are to be converted into car-sharing vehicles with the least possible effort, so that costs are as low as possible.

SUMMARY OF THE INVENTION

It is therefore the object of the present invention to remedy, at least in part, the foregoing disadvantages known from the state of the art. In particular, it is an object of the present invention to enable an identification device to actuate, preferably without manual actuation by the user being necessary and/or without it being necessary for the user to take possession of the identification device. In particular, operation should also be possible for different standard identification devices, preferably within a container device.

The preceding object is solved by a container device with the characteristics of claim 1, an insert with the characteristics of claim 13, a container system with the characteristics of claim 21 and a method with the characteristics of claim 22. Further characteristics and details of the invention result from the dependent claims, the description and the drawings. Features and details which have been described in connection with the inventive container device naturally also apply in connection with the inventive insert, the inventive container system and/or the inventive method and vice versa, so that with regard to disclosure the individual aspects of the invention are or can always be mutually referred to.

According to the invention, the container device for storing an identification device in a vehicle has a key compartment with a cavity in which the identification device can be stored. Furthermore, the container device has an actuating mechanism by means of which actuation of at least one first control element of the identification device (in particular mechanically, preferably exclusively mechanically) can be performed, in particular when the identification device is positioned in the cavity. The container device itself can be controlled and/or checked by radio (meaning wireless).

The vehicle can preferably be a car sharing vehicle, which can only be borrowed temporarily by a user. The identification device can be advantageously understood as an electronic vehicle key which can trigger a vehicle function in particular by emitting radio signals. This can be performed, for example, by the fact that the identification device can be brought into data communication with a vehicle control unit and/or that the vehicle control unit receives the radio signals from the identification device and, if the identification device is correctly authenticated, triggers a corresponding vehicle function. Data communication signals of the data communication can include, for example, authentication data, control commands and/or recognition data. Identification data can, for example, have a certain frequency by which the identification device and/or the presence of the identification device can be identified. Preferably, the vehicle function can be an engine start, an unlocking of an immobilizer, and/or a locking and/or unlocking of a locking system, preferably a door lock, of the vehicle. The locking system may include, for example, a central locking system for the vehicle. In particular, the identification device can permanently transmit signals or transmit a certain type of radio signal when the first control element of the identification device is actuated. In addition or alternatively, the identification device can include a passive transponder, for example in the form of an RFID chip, which can be activated externally by radio signals and can send back corresponding electromagnetic signals. Thus, the identification device is preferably an identification device for a keyless go system, especially for a so-called passive entry system and/or passive start system. With such a system, it may be sufficient to detect a presence of the identification device in the vehicle or within a certain radius in order to activate certain vehicle functions. For example, the locking system of the vehicle can be unlocked automatically or the engine can be started by actuating a start/stop switch. The release can be made by the vehicle electronics, whereby a corresponding signal can be provided by the identification device. The cavity can, for example, be a cavity in a key compartment in which the identification device can be stored. The cavity can advantageously be configured to be closable or permanently closed. The actuating mechanism is now used in particular for the mechanical actuation of the identification device or a control element of the identification device. In particular, the first control element can thus trigger a signal from the identification device which leaves the container device and activates vehicle electronics which receive the signal, so that a specific function, such as opening the trunk or unlocking the door locking system of the vehicle, is triggered. For actuation, the actuating mechanism may have at least one actuator which may act with the first control element. In particular, the actuating mechanism may be adapted to effect actuation of the first control element when the identification device is positioned in the cavity corresponding to the actuating mechanism and/or the actuating mechanism is activated.

This means that it may not be necessary to hand over the identification device to the user so that he can gain access to the vehicle. Instead, at least the most important or all functions of the identification device can be operated by the actuating mechanism. Preferably, the container device can therefore be automated so that the actuating mechanism operates without manual intervention by the user. This may allow the container device to be actuated only to trigger the actuating mechanism and thus actuate the first control element of the identification device. If, for example, a user wishes to gain access to the vehicle from outside, the container device is actuated accordingly so that the actuating mechanism triggers, activates the first control element and thus unlocks the locking system of the vehicle. This allows the user to gain access to the vehicle. An engine start can be possible, for example, if the identification device verifies to the vehicle that it is present in the vehicle, so that when the user leaves the vehicle, the vehicle can be automatically locked again, for example by actuating a second control element by the actuating mechanism. Thus, the security of the identification device and the vehicle as a whole can be increased by the container device, since it is not necessary to hand over the identification device to the user or to deposit it in the glove compartment. Rather, the identification device can remain in the container device. In addition or alternatively, the container device can be used as a secure depot for the identification device. For example, the user can gain access to the vehicle by verification against the container device by the actuating mechanism triggering the first control element while the identification device is in the container device. Then it is conceivable that the user removes the identification device from the container device and starts the vehicle with the identification device. Thus, theft protection can be improved. For example, the container device can be safe-like configuration and therefore provide greater safety than the glove compartment of a vehicle. Furthermore, a container device according to the invention enables the use of a standard identification device, so that no or hardly any conversions are necessary on the vehicle. For example, it may be sufficient to place the container device in the vehicle to convert the vehicle into a car sharing vehicle. In particular, no further modifications to the vehicle's locking system may be necessary as the vehicle's standard identification device may be usable.

Preferably, the container device can be a remote controlled key safe. Preferably, the container device and/or the key compartment may have a space volume which is less than or equal to 200 mm×150 mm×150 mm. As a result, the container device can be placed in various areas of the vehicle and can only have a minor effect on the vehicle's appearance and/or the interior.

Preferably the actuating mechanism of a container device according to the invention further comprises a rotary element which is rotatably mounted, wherein the actuation of the first control element is executable by a rotation of the rotary element. The rotary element can be understood, for example, as a shaft which projects into the cavity so that the first control element can be actuated directly or indirectly when the rotation element is rotated.

Within the scope of the invention, it may be provided that the rotary element is at least partially arranged in the cavity and/or projects into the cavity. This means that the control element can be actuated directly or indirectly by the rotary element. In contrast to a plunger, which for example can be pushed into the cavity from the outside in order to actuate the first control element, the rotary element, which is at least partially arranged in the cavity or protrudes into the cavity, has the advantage that it is not easy to remove and is therefore burglar-proof in relation to the cavity. In addition, the rotatable rotary element can be arranged to save space. For example, the rotary element can only protrude from the cavity at one end or at both ends and have a coupling with a transmission, for example. The coupling can preferably, for example, comprise a polygonal profile, so that a gearwheel of the transmission can be fitted onto the rotary element and can be positively entrained, or the rotary element can be positively entrained by the gearwheel, so that the installation space of the container device can be reduced in the longitudinal direction of the rotary element.

It is also conceivable that, in the case of a container device in accordance with the invention, at least one first control body is arranged on the rotary element. Preferably, the first control body can be configured in one piece with the rotary element or can be arranged integrally on the rotary element. The first control body may preferably be configured to actuate the control element when the rotary element is rotating. If the first control body is configured integrally with the rotary element, the structural unit of the first control body and the rotary element, e.g. in a casting process, can be manufactured particularly easily. Furthermore, the integral configuration also ensures that the first control body is securely fastened to the rotary element, so that no additional fastening effort is required and, at the same time, the rotary element can be configured as required. Preferably, it can therefore be a forged or cast part. If the rotary element and the first control body are made of two parts, the control body may have a more complex shape, for example, since it can be manufactured individually. It is also possible to individually equip the same rotary element with different control bodies. For example, a certain control body can be provided for a certain vehicle type, which can be configured to match the identification device of the respective vehicle type. Thus, for example, the first control body can be individually adjustable during the assembly of the container device and attached to the rotary element.

Within the scope of the invention, it may also be provided that the first control body along a rotary axis of the rotary element is arranged axially displaceable on the rotary element. Due to an axial displaceability of the control body on the rotary element, the first control body, preferably in its position on the rotary element, can be adapted individually to the identification device and/or the position of the identification device in the cavity. For example, it is conceivable that the identification device in the cavity can be inserted in different positions and it is therefore necessary to adapt the position of the first control body to the position of the first control element of the identification device in the cavity. Even if the position of the identification device in the cavity is specified, the displaceability can also ensure that the cavity or the actuating mechanism is suitable for operating different identification device.

Preferably, in a container device according to the invention, the first control body can form a positive connection with the rotary element in such a way that a torque can be transmitted from the rotary element to the first control body. This means that the first control body can, for example, be arranged on the rotary element so that it can be moved axially and, at the same time, the positive locking can ensure that the control body is carried along when the rotary element is rotated and can transmit a force or torque. In addition, the rotary element can preferably have a polygonal profile in the cross-section or a polygonal profile, especially a square profile. For example, a polygonal profile of the rotary element represents a simple way of configuring the rotary element in such a way that it can be produced cost-effectively and at the same time guarantees the form-fit to take the control body with it. An oval profile, an eccentric profile or the like is also conceivable here. The form-fit connection can favor the transmission of force or torque and at the same time ensure that the first control body can be mounted and/or moved axially. Such a form closure also has advantages in terms of manufacturing tolerances, so that the manufacturability can be cost-effective and at the same time a play of the control body on the rotary element can be kept to a minimum. Preferably the control body has a negative profile of the rotary element through which the rotation element can be inserted.

In the context of the invention, it is also conceivable that the first control body has, at least in some areas, a recess through which the position of the first control body on the rotary element can be fixed in a positive-locking manner with a rail element. Preferably, an eccentric course, in particular an outlet, of the recess can form a control contour for actuating the first control element. If, for example, the first control body is axially displaceably arranged on the rotary element, the recess, which can act with a rail element, can ensure that the control body no longer displaces after it has been brought into position or active connection with the rail element. Thus, the actuating mechanism may, for example, comprise a further actuating means, which the rail element has. The actuating means can preferably be configured as a plunger in the cavity. Thus, for example, an identification device can be used for each vehicle type, for which, however, only the actuating means is adapted, while the other components of the container device can be suitable for different vehicle types. The control contour can preferably have an eccentric course, so that the depth of the recess in the control body varies in all directions. Preferably, the control contour has an eccentric cross-section, in particular a cam, which runs tangentially on one side of the control body with an outer circumference of the first control body. If the rail element in the recess is initially in the fixed position of the control body, a rotation of the rotary element can also cause the control body to rotate and thus roll the control contour on the rail element. Due to the eccentric course, the rail element can thus be adjusted by the first control body, in particular moved down, and thus the first control element can be actuated by the actuating means. The actuating mechanism with the control body can therefore be used to convert a rotary movement into a translatory movement of the actuating means. Typically, standard identification device are configured to be operated manually with a finger, so that the first control element can be configured, for example, to respond to a pressure or linear movement. Linear actuation is therefore particularly advantageous here, so that wear on the control element of the identification device can be reduced.

Preferably, in the case of a container device conforming to the invention, it may be provided that the actuating mechanism is configured in such a way that only the one rotary element extends from the outside into the cavity. Thus, all other components of the actuating mechanism can be located outside the cavity or inside the cavity.

For example, it may be provided that the cavity is shielded with respect to burglar resistance, impermeability to environmental conditions such as humidity and/or shielding of radio waves to manipulate the identification device and/or the vehicle by means of the identification device. It may therefore be sufficient to secure the rotary element or a rotatable guide of the rotary element accordingly, whereby all other components accordingly do not require any additional protection or cannot influence the protection of the cavity.

In the context of the invention, the container device may also preferably have a shielding unit by means of which wireless data communication of the identification device with the vehicle can be prevented at least in one region of the cavity. The cavity can be formed at least partially by the shielding unit. This means that wireless data communication between the identification device and the vehicle can be prevented throughout the entire cavity. Thus, the identification device can be stored in the container device without it authenticating itself to the vehicle and the vehicle electronics assuming that a vehicle function is to be triggered. Thus, it may be sufficient to open or deactivate the shielding unit to allow the identification device wireless data communication access with the vehicle. Thus, the identification device can preferably remain in the container device during the entire triggering process of the vehicle function, so that only the shielding of the shielding unit can be temporarily lifted in order to enable the emission of the signals. In particular, the shielding unit may be active and/or passive. An active shielding unit can, for example, emit electromagnetic signals, in particular interference signals, which superimpose signals on wireless data communication and thus prevent or restrict them. In particular, the shielding unit may be intended to transmit LF signals. A passive shielding unit can, for example, prevent or restrict the ingress and/or egress of wireless signals by appropriate configuration of the cavity. A passive shielding unit has the advantage that no energy is required for the shielding effect and the shielding unit can therefore be independent of an energy source, in particular a vehicle-side energy source. It may be provided that the user, for example, intervenes in the container device in order to actuate the identification device or has no access at all to the container device, if the identification device is actuated automatically or, in any case, can continuously emit or transmit electromagnetic signals and thus authenticates himself to the vehicle when the shielding is removed. In particular, the container device may be configured to be retrofitted in the vehicle. This means that preferably a standard vehicle can be easily converted into a car sharing vehicle. In particular, the identification device can be stored in the container device in the vehicle independently of its operation (e.g. for passive start systems), e.g. if the vehicle changes users without vehicle functions being triggered by the identification device. This makes the container device suitable for use with different vehicle types.

It is also conceivable, in the case of a container device according to the invention, that the shielding unit comprises a lining of the cavity and a cover element, in particular the cavity being completely isolated from wireless data communication in the locking state of the closure unit. It is advantageous for the lining to be metallic and, for example, to form the cavity by inserting a metallic insert into a housing. In addition or alternatively, the lining can include a metal foil which surrounds the cavity layer by layer, at least in certain areas. The cover element may preferably be attached to a lid element of a housing of the closure unit so that in the closure state the opening is closed by the cover element, in particular so that the shielding unit completely isolates the cavity in the locking state from the wireless data communication. In particular, the cover element may comprise a film arranged on the lid element of the closure unit. Thus, a Faraday cage can preferably be formed by the shielding unit, which suppresses electromagnetic signals from the cavity and/or into the cavity. This can create a cost-effective type of passive configuration of the shielding unit that prevents wireless data communication between the identification device and the vehicle. Thus, for example, it may be sufficient if the lining and/or cover element are grid-like to prevent wireless data communication from passing through the shielding unit. This means, for example, that additional weight of the container device can be saved, so that this has no or only little effect on the fuel consumption of the vehicle.

It is conceivable in the context of the present invention that the container device has an external housing which at least partially or completely surrounds the key compartment and/or the closure unit and is operatively connected to the closure unit in such a way that, in the event of unauthorized removal of the external housing transfer of the closure unit from the locking state to the opening state is prevented. For example, the mechanical locking mechanism in particular can be deactivated in a normal state of the container device and only be activated when the external housing is removed, so that the mechanical locking mechanism in particular locks the closure unit, which can then no longer be transferred to the opening state. For example, a bolt is conceivable, which is activated accordingly when the external housing is dismantled and has a locking effect. This means that the cavity can be doubly protected, allowing the closure unit to open and close underneath the external housing and at the same time preventing access to the identification device. Thus, for example, it can be provided that the identification device is not handed over to a user of the vehicle at all, but only the closure unit underneath the external housing is transferred to the opening state in order to release a function, such as the emission of a radio signal, of the identification device and is transferred back to the locking state after a corresponding vehicle reaction. A manual intervention of the user is not necessary here.

It is also conceivable that the key compartment comprises a housing, in particular wherein the housing is at least partially or completely surrounded by the external housing. This can provide double protection of the cavity, whereby the housing preferably houses the key and the external housing encloses the housing and the closure unit. If the external housing is removed without authorization, e.g. by force, the identification device can still be housed through the housing in the key compartment and thus protected against theft. This results in an increased security of the identification device against theft. In particular, if the external housing is removed, it may be provided that the container device, in particular an electronic unit of the container device, emits a signal which correspondingly indicates an attempted break-in into the container device. This signal can be received, for example, by an external server that informs a control center.

It is further conceivable that at least one second control body is provided in a container device according to the invention, wherein the first control body can actuate the first control element of the identification device when the rotary element rotates in a first direction of rotation and the second control body can actuate a second control element of the identification device when the rotary element rotates in a second direction of rotation. Thus, it can be easily ensured that two different functions of the identification device, which are linked to two different control elements, can be triggered independently of each other. Preferably, a further control element can also be provided, which, for example, can be actuated after the first control element has been actuated, so that when rotating in the first direction, the first control element is actuated first and then another control element of the identification device. This is conceivable, for example, if the vehicle is first to be unlocked and then locked, but both functions are occupied by different control elements. Preferably, the first and second control bodies may be offset relative to each other on the rotary element such that the eccentric course of the control contour of the first control body has an angle to the eccentric course of the control contour of the second control body. Another advantage is that the first and second control bodies can be of identical configuration so that they can be manufactured cost-effectively in series production and can simultaneously implement different functions. This can therefore have a positive effect on reduced complexity in the manufacture and/or assembly of the container device. It is also conceivable that the profile of the rotary element differs in certain areas, in particular in its orientation in certain areas. Thus, for example, an offset of the eccentric course of the control contour or the recess of the control body can be automatically brought about during assembly without it being necessary to check the correct placement. Another advantage is that each control body can only be displaceable in a region of the rotary element and thus there is no danger that a plurality of control bodies are located on one side of the rotary element, although at least one of the control bodies is provided for an control element on another side of the rotary element.

Within the scope of the invention, it is also conceivable that an actuating drive is provided via which the rotary element can be driven. This may improve automation of the actuating mechanism. For example, the actuating drive can preferably be operated via the container device's own energy source, e.g. a battery, so that the container device can be independent of vehicle electronics. This means that it is not necessary to adapt the container device to vehicle interfaces or to position it at a specific point in the vehicle. Preferably, the actuating drive can comprise an electric motor which can drive the rotary element, in particular via a transmission. Therefore it is not necessary to rotate the rotary element manually. In particular, manual intervention by a user may not be necessary.

In the case of a container device according to the invention, it is also conceivable that an electronic unit is provided which is in communication with the actuating mechanism and/or the closure unit. In particular, the electronic unit may comprise a control unit of the container device. The electronic unit can also support the independence of the container device from vehicle electronics, so that the actuating mechanism and/or the closure unit can be activated automatically. In particular, the electronic unit may be electrically and/or wirelessly connected to the actuating mechanism and/or the closure unit and/or a locking mechanism in order to ensure their function. The electronic unit can therefore preferably comprise a circuit and/or a processor, preferably a microprocessor, in order to be able to control the individual components of the container device accordingly.

Preferably, the electronic unit of a container device according to the invention can have a communication interface, in particular via which the electronic unit can be controlled. In particular, the electronic unit can be connected via the communication interface to a mobile device of a user. The mobile device can preferably be a smartphone, tablet or similar of a user which is configured to communicate with the electronic unit. For example, a program can be installed on the mobile device that can control the communication interface. Preferably the communication interface is an interface for wireless communication, e.g. a WLAN interface, Bluetooth interface, ZigBee interface, NFC interface, mobile radio interface or the like. This can simplify the control of the electronic unit or the container device. In addition or alternatively, the communication interface can include a wired interface, e.g. a USB interface. The wired interface may be accessible from the outside of the container device and/or access may be provided through the wired interface from the outside of the vehicle. In addition or alternatively, it is conceivable that the electronic unit can be connected to an external server. For this purpose, the communication interface can advantageously include a mobile radio interface (e.g. GSM interface, UMTS interface or LTE interface). For example, it can be provided that the user identifies himself to the server via the Internet and/or mobile radio or requests access to the vehicle. If the server determines that the user is authorized to access the vehicle, the server can control the container device which, for example, at least partially lifts the shielding of the shielding unit so that a locking system of the vehicle can be unlocked on the basis of a signal from the identification device. Thus, a user can communicate directly or indirectly with the electronic unit via the communication interface in order to operate the container device or to trigger functions, e.g. the actuating mechanism and/or the closure unit. In particular, the authentication of the user can be shifted to the server, so that lower demands can be made on the required computing power of the electronic unit, which can then be configured to be cost-effective. In addition, the electronic unit and/or the communication interface may support automatic triggering of certain vehicle functions. This means, for example, that it may not be necessary for a user to have access to the identification device and/or for a special lock to be provided on the vehicle, since the locking system installed as standard can be used with the identification device installed as standard. It may therefore be sufficient to place the container device in the vehicle without giving the user access to the identification device. This means that the identification device remains in the vehicle and is not lost. Preferably, the electronic unit may be configured to require a separate access code and/or authentication signal for each vehicle function. For example, it is conceivable that a user with a first access code can trigger the unlocking of the vehicle's locking system and a second access code can release the engine to start. If the identification device is configured for use with a passive entry system and/or passive start system, the corresponding vehicle function can, for example, be enabled by at least partially removing the shielding and/or actuating a control element of the identification device.

Preferably, a transmission unit may be provided between the actuating drive and the rotary element. For example, a transmission of a driving force or a driving torque can be provided which, for example, can be transmitted from a fast-rotating electric motor to a slow movement of the rotary element in order to reduce wear on the control element of the identification device. At the same time, the transmission can bridge the installation space in almost any way so that, for example, a drive shaft of the electric motor can be arranged parallel to the rotary element in the container device and the transmission which, for example can be a spur gear, can nevertheless drive the rotary element. Thus, for example, the installation space of the container device can be reduced.

It is conceivable in the context of the invention that the key compartment is configured in such a way that the identification device can be positively received in the cavity. Thus, for example, a key receptacle can be provided in which the identification device can be inserted, so that the rotary element and/or the control body can act with the control element of the identification device. For this purpose, the key compartment can provide an appropriate recording.

Preferably, the closure unit of a container device conforming to the invention may also have a locking mechanism through which the cavity can be locked against unauthorized access. The locking mechanism may preferably have a mechanical locking effect, by means of which a transfer of the closure unit from the locking state to the opening state can be prevented. If the identification device is thus stored in the cavity, the locking mechanism can be used to increase the security of the identification device. For car sharing vehicles, the container device can be mounted in the vehicle and the identification device can be stored in the container device. If the car sharing vehicle changes users, the following user finds the identification device in the container device and can unlock the mechanical locking mechanism e.g. via electronic authentication. However, a thief who gains unauthorized access to the vehicle still only finds the container device and cannot easily remove the identification device from the cavity because the locking mechanism prevents him from doing so.

According to another aspect of the invention, an insert for storing an identification device in a cavity of a container device is claimed. In particular, the container device may be an inventive container device. The insert has a receptacle which forms a key receptacle in which the identification device can be stored, in particular with a positive fit. The receptacle can be placed in the cavity, especially with the identification device. Furthermore, the receptacle has at least one actuating means which, when the receptacle is arranged in the cavity, can be brought into operative connection with an actuating mechanism of the container device, so that, when the actuating mechanism is activated, an actuating force can be exerted by the actuating means on a first control element of the identification device.

Thus, an insert according to the invention has the same advantages as those already described in detail with regard to a container device according to the invention. The receptacle may preferably have a foam and/or be formed as a deep drawing part. In addition or alternatively, the receptacle can be configured as a plastic injection-molded part. This means that the receptacle can be produced cost-effectively and reproducibly. Furthermore, due to the insert, it is not necessary to constructively adapt the container device to each vehicle type or identification device type. Rather, an individual insert can be provided, which can be produced cost-effectively. This allows the functionality of the container device to be extended for different identification device types. At the same time, the insert preferably represents an extension of the actuating mechanism of the container device in that the receptacle can be brought into operative connection with the actuating mechanism, whereby the actual actuating force can be exerted by the actuating means of the insert on the identification device or the first control element of the identification device. Thus, for example, a rotary actuation of the actuating mechanism of the container device can be converted into a linear actuating force in order to reduce wear of the identification device.

Preferably, the actuating means and the key receptacle can be configured in integrally. For this purpose, the actuating means can be moved to the key receptacle by means of film hinges, for example. This can mean, for example, that the insert can be used completely or almost completely as a tool, after it has been produced in a casting process, for example. Alternatively, the actuating means and the key receptacle can be configured at least in two parts so that the actuating means is inserted into the receptacle. Preferably, the receptacle and the key receptacle can be provided in integrally. For example, the key receptacle can be configured as a cavity in the adapter body so that the identification device can be inserted into the key receptacle. The actuator and key receptacle can be manufactured separately from each other by an actuating means of at least a two-part configuration and a possibility of relative movement between the actuating means and the key receptacle can be ensured. Furthermore, for example, a guide for the actuating means can be provided in the receptacle so that the actuating means can be arranged positively in the receptacle.

Preferably, in the case of an insert conforming to the invention, the actuating means may be configured in such a way that the actuating force can be exerted linearly or essentially linearly on the first control element. Thus, the actuating means can preferably be configured as a plunger which, for example, can translate a rotational movement of the actuating mechanism of the container device into a linear movement. A linear or essentially linear actuation of the first control element can reduce wear on the control element, since such control elements of standard identification device are often configured to react to manual pressure, so that, for example, friction caused by a direct rotational movement could have a negative effect. In addition, the actuating means may preferably be low-wear and, for example, have a wear-resistant surface so that reliable operation of the first control element is maintained even if the actuating means is frequently actuated by the actuating mechanism of the container device.

Preferably, the key receptacle can have at least one insertion aid with an ingenious insert, which ensures orientation of the identification device in a maximum of two positions, preferably in only one position, in the key receptacle. In particular, the insertion aid can be configured in such a way that a securing element cannot be locked if the identification device is incorrectly oriented, e.g. because the identification device protrudes in the key receptacle. The insertion aid may preferably have a negative form of the identification device so that it can be inserted into the key receptacle in a form-fitting manner, whereby only an upper side or a lower side of the identification device can be aligned with the actuating means. Furthermore, the insertion aid, for example, can have a pin which can be operatively connected to a ring-shaped key ring receptacle of the identification device, so that only one position in the key receptacle can be occupied by the identification device.

Furthermore, a company logo or other configuration elements of the identification device can also be used to define the insertion aid, whereby the insertion aid can then have a negative form of the corresponding company logo, for example, so that incorrect orientation of the identification device in the key receptacle can easily be noticed. This can reduce or prevent incorrect mounting of the identification device in the insert.

In the context of the invention, it is also conceivable that the identification device can be inserted into the key receptacle from a first side of the receptacle and the actuating force can be exerted on the actuating means and/or the first control element from a second side of the receptacle. This means that the actuating means can be configured independently of an opening for the identification device. Thus, it may not be necessary to mount the actuating means only after the identification device has been placed in the key receptacle, so that incorrect assemblies can be reduced if necessary.

Furthermore, in the case of an insert according to the invention, it may be provided that the receptacle has a securing element on the first side by means of which the identification device can be fixed in the key receptacle. Preferably, the securing element can have a latching closure. Thus, the identification device can be inserted into the insert from the first side and then the key receptacle can be at least partially locked with the identification device by the securing element, so that the identification device cannot fall out of the key receptacle. This allows the insert to be turned over in order to place it, for example, in the container device. The securing element may preferably have a latching closure, which provides a positive fit to fix the securing element to the receptacle. The securing element can be configured integrally with the receptacle or in several parts, in particular in two parts. For example, the securing element can be connected to the receptacle via a film hinge. This means that the securing element can be lifted from the key receptacle in at least some areas, even in the case of an integrally configuration. The latching closure provides an easy way of fixing the securing element reversibly or irreversibly to the receptacle without any additional component and thus securing the identification device in the key receptacle. In particular, the securing element can exert a preload on the identification device so that it can be stored in the key receptacle with as little play as possible. By storing the identification device in the key receptacle with as little play as possible, it is possible to improve the user's perception of the container device, especially while driving. Furthermore, safe storage can have a positive effect on the service life of the container device and/or identification device.

In the context of the invention, it is also conceivable that the insert has at least one inlet path through which a first control body of the actuating mechanism and the insert can be aligned with each other. Preferably the inlet path can be funnel-shaped. For example, the insert can be suitable for acting with an actuating mechanism of the container device which has at least one control body which is axially displaceably mounted on a rotary element of the actuating mechanism. When the insert is inserted into the container device, the inlet path ensures that at least one of the control bodies of the actuating mechanism is guided in the inlet path and finally has the correct position to the actuating means when the insert is fully positioned in the container device. This ensures that the container device or insert functions properly and that the first control element of the identification device can be reliably actuated by the actuating mechanism and the first actuating means. This can provide a particularly simple installation option, which reduces the risk of incorrect installation.

Preferably, in the case of an insert according to the invention, the actuating means may comprise a rail element which can be positively connected or positioned with the actuating mechanism, in particular with the control body of the actuating mechanism. The rail element thus ensures that the control body of the actuating mechanism does not leave this position again when correctly positioned and that the container device or identification device functions correctly. For this purpose, the rail element can preferably act with a recess in the control body of the actuating mechanism. Thus, the rail element can preferably be configured as an elevation of the actuating means, which has a recess on at least one, preferably two sides, so that the rail element can be at least partially embraced by the control body, for example. This ensures a reliable form-fit on the one hand and an actuating function of the actuating means on the other when a control contour of the first control body rolls over the rail element.

According to a further aspect of the invention, a container system is claimed which has a container device according to the invention as well as an insert according to the invention. The insert can preferably be inserted positively into a key compartment, in particular into a cavity of the key compartment of the container device, whereby an identification device can preferably be inserted into the insert. Thus, a container system according to the invention has the same advantages as they have been explained in detail with regard to a container device according to the invention as well as an insert according to the invention.

According to another aspect of the invention, a method of actuating an identification device for a vehicle is claimed, whereby the identification device is stored in a container device at least temporarily or during the entire method. Preferably, the container device is a container device according to the invention. The method also includes the following steps:

Driving an actuating mechanism of the container device,
Actuation of a first control element of the identification device as a result of the actuation of the actuating mechanism, in particular wherein a wireless communication signal is triggered.

Thus, a method according to the invention has the same advantages as those already described in detail with regard to a container device according to the invention. The wireless communication signal may preferably be a signal from the identification device. In particular, the identification device is assigned to the vehicle, e.g. by a certain frequency of the communication signal that can be received by the vehicle. Preferably, actuation of the identification device can at least indirectly trigger an engine start and/or a locking and/or unlocking of a vehicle locking system. This enables the identification device to be placed in the container device and, in particular, to operate the first control element automatically. The actuation of the first control element can preferably be provided mechanically, whereby the first control element can, for example, be pressed down. This means that it is not necessary to hand over the identification device to the user of the vehicle in order to enable the vehicle function to be triggered. Rather, the release can take place by the actuating mechanism, whereby a standard identification device can be used. The actuating mechanism can be operated manually and/or automatically.

In the context of the invention, it is also conceivable that driving the actuating mechanism comprises rotating a rotary element of the actuating mechanism in a first direction of rotation. By rotating the rotary element, the first control element of the identification device can preferably be actuated directly or indirectly.

The invention may also provide for the rotary element to be driven by a transmission. The transmission can ensure a transmission from a drive to the rotary element, whereby the drive can be an electric motor or a manual drive, for example. The transmission can be used to adjust the speed of the rotary element and/or the force transmission of the rotary element.

In the context of the invention, it is also conceivable that the rotation of the rotary element causes a control body to rotate and the actuation of the first control element comprises the following steps:

Actuating a first actuating means by the first control body acting on the first actuating means,
Actuation of the first control element by the first control element acting on the first control element.

Thus, it is possible in a simple way to convert a rotary movement of the rotary element into a translatory, in particular linear, movement of the actuating means. The actuating means can preferably be part of an insert which is arranged in the container device, so that only the insert can be individually adapted to the identification device. In particular, the actuating means can be adapted in its position with the control body to the identification device or to the positioning of the control element on the identification device. Thus, the positioning of the control body can be variable, but the construction of the container device can still be uniform across different vehicle types. Thus, only the actuating means or the insert can be adapted to the respective configuration of the identification device.

In the case of an inventive method, it is also conceivable that the following steps are provided:

removing a shield against wireless data communication of the identification device with the vehicle by opening the container device, and/or
Close the container device.

The container device may be provided with a shielding unit which shields the identification device from radio signals. This may prevent a radio signal from the identification device from leaving the container device and at the same time prevent a radio signal from outside from penetrating to the identification device when it is in the container device. If the shielding is now removed, a wireless communication connection between the identification device and the vehicle can be provided or enabled. For example, the rotary element can then be rotated so that the first control element is actuated and the identification device emits a corresponding radio signal corresponding to the function of the first control element. If, for example, the identification device is an identification device which permanently emits signals or whose presence in the vehicle is recognizable by the vehicle electronics by emitting signals or by receiving signals, this can be prevented by the shielding and thus the identification device can be placed in the vehicle and locked in the container device without the vehicle being usable by an unauthorized person.

In the context of the invention, it is also conceivable that the following steps are performed to store the identification device:

Inserting the identification device into an insert, in particular so that the identification device is positively fixed in a key receptacle of the insert,
Placement, preferably insertion, of the insert into a cavity of the container device.

Preferably, the insert can be an invention. Due to the insert, it is not necessary to adapt the container device constructively to each individual identification device type, which is to be operated with the container device or the actuating mechanism, but only the insert can be adapted to the respective identification device types. A form-fit insertion into the insert also guarantees a secure positioning of the identification device in the container device and the insertion of the insert into the cavity makes it easy to position the position and identification device in the container device. Preferably the insertion can be a tight fit.

Preferably, a method in accordance with the invention may provide that the insertion of the identification device into the insert involves closing the key receptacle by means of a securing element. This allows the identification device to be inserted into the key receptacle and the securing element to ensure that the identification device remains placed in the container device. By closing with the securing element, the identification device can on the one hand be fixed, preferably pre-tensioned, and on the other hand it can be ensured that the installer receives feedback that the identification device has been inserted correctly, otherwise it may be prevented that the securing element can be closed. In particular, the securing element can have a latching closure and thus be locked to the key receptacle in order to lock the key receptacle.

The invention may also provide that when the insert is inserted into the cavity, at least the first control body is automatically positioned along the rotary element, preferably along an rotary axis of the rotary element, to the first control element. For example, the insert can have a funnel-shaped inlet path which catches the first control body and guides it to the correct position so that it is positioned above the actuating means in particular. This makes it easy to ensure the safe position of the control body while at the same time eliminating the need to adapt the entire container device to each individual identification device type, with the insert being adapted accordingly instead.

In the case of a method in accordance with the invention, the method steps can run at least partially simultaneously or successively in time, whereby the sequence of the method steps is not limited to the sequence described, so that individual steps can be performed in different sequences. In particular, individual steps of the method may be repeated and/or all steps of the method may be repeated.

BRIEF DESCRIPTION OF THE DRAWINGS

Further measures to improve the invention result from the following description of some examples of the embodiments of the invention, which are shown schematically in the figures. All features and/or advantages resulting from the claims, the description or the drawings, including configuration details, spatial arrangements and method steps, may be essential to the invention both in themselves and in various combinations. It should be noted that the figures are only descriptive and are not intended to restrict the invention in any way. It is shown:

In the following figures, the identical reference characters are used for the same technical characteristics, even for different embodiments.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
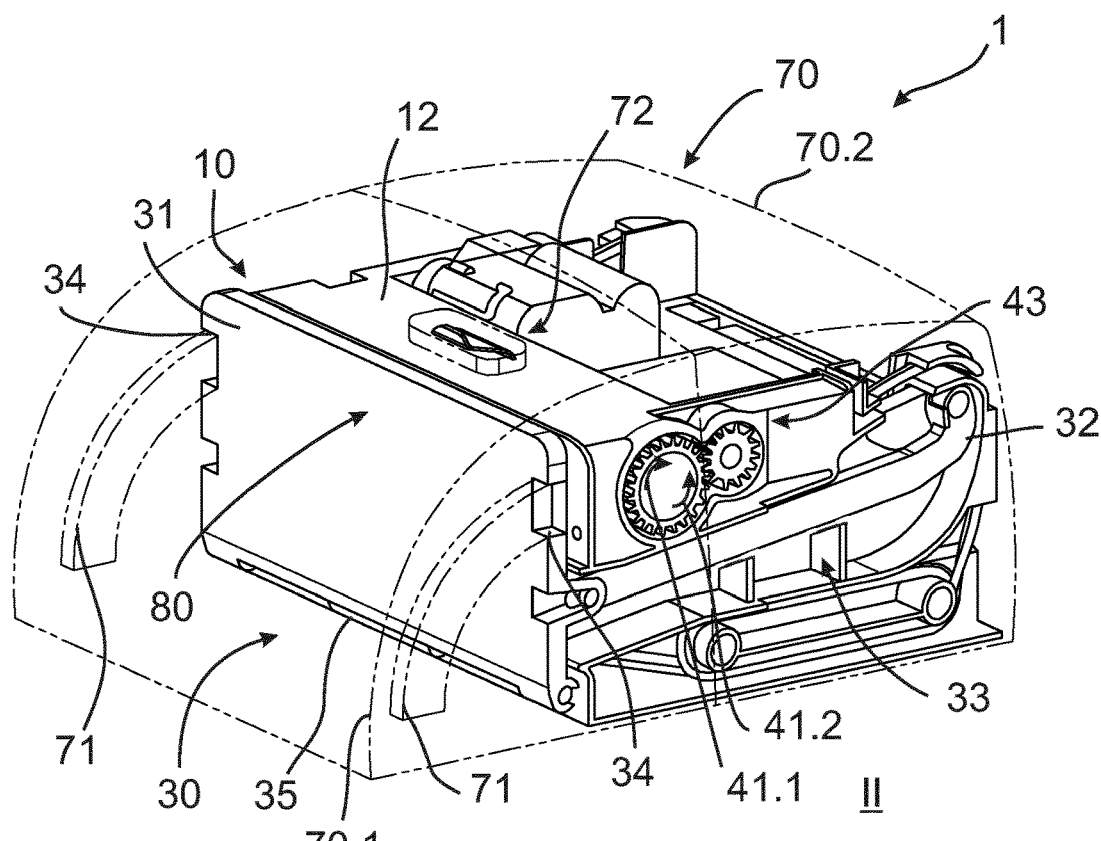
FIG. 1 a container device according to the invention in schematic at least partially transparent view in a first embodiment, FIG. 2 an external housing of the invention container device of the first embodiment, FIG. 3 the container device according to the invention in schematic perspective view in the opening state according to the first embodiment, FIG. 4 an insert according to the invention with the container device according of the invention of the first embodiment, FIGS. 5a to 5c an insert of the first embodiment in schematic views, FIG. 6 The container device according to the invention in which the insert according to the invention is inserted, in a schematic perspective view according to the first embodiment, FIGS. 7a and 7b schematic partial views of the actuating mechanism of the container device of the first design embodiment, FIG. 8 The container device according to the invention of the first embodiment in schematic perspective view in representation without external housing, FIG. 9 A vehicle according to the invention with a container device according to the invention in another embodiment, FIG. 10 an emergency locking system for locking an external housing of a container device according to the invention in another embodiment, FIG. 11 a sequence of method steps of a method according to the invention in a schematic representation in another embodiment.
Figure 10:
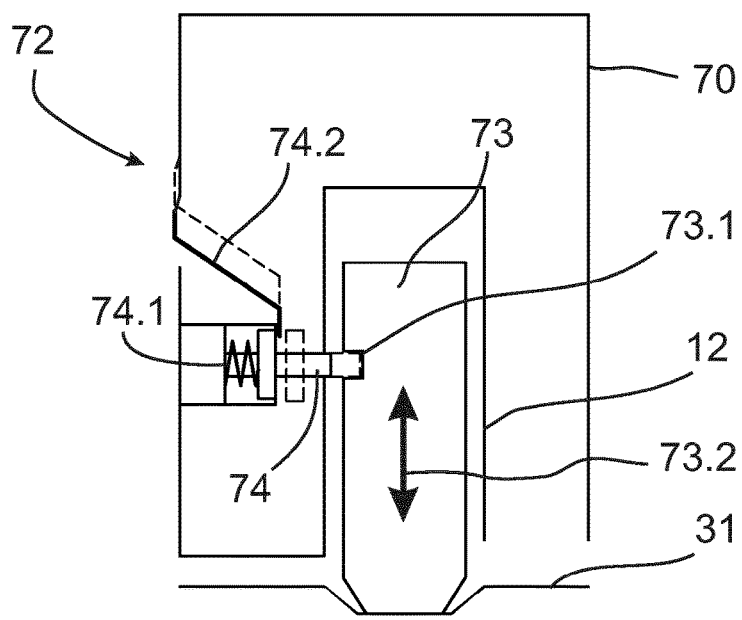

FIG. 1 shows a container device 1 according to the invention in a schematic perspective view according to a first embodiment. The container device 1 has an external housing 70, which comprises a first external housing part 70.1 and a second external housing part 70.2. Through the two external housing parts 70.1, 70.2 a key compartment 10, in which an identification device 2 can be arranged, can be easily arranged below the external housing 70 or the external housing parts 70.1, 70.2 can be mounted above the key compartment 10 so that it is inaccessible from outside. Below the external housing 70 there is also a housing 12 of the key compartment 10. The key compartment 10 has a cavity 11 inside the housing 12, in which the identification device 2, which serves in particular as a vehicle key, can be arranged. The container device 1 also has a closure unit 30 by which the cavity 11 can be closed. FIG. 1 shows a locking state II of the closure unit 30, in which a lid element 31 closes an opening 13 of the key compartment 10. The lid element 31 is in contact with the housing 12 and/or a lining 21 of a shielding unit 20, the lining 21 projecting at least partially into a groove 31.1 of the lid element 31, so that a positive fit ensures reliable protection. The shielding unit 20 is configured passively so that wireless data communication of the identification device 2 can be prevented when the shielding is closed. In particular, the identification device 2 can thus be safely stored in the container device 1 without a vehicle function being triggered by the corresponding signals by means of the identification device 2. Alternatively, the shielding unit 20 can be actively configured and comprise, for example, a transmitter which can prevent wireless data communication of the identification device 2 by emitting corresponding interference signals. The lid element 31 is also hinged to the housing 12 by a swivel joint 35 on the one hand and hinged to an opening arm 32 of the closure unit 30 on the other hand. If the opening arm 32 thus moves in the direction of the lid element 31, it swings up around a rotary axis of the swivel joint 35. In particular, a locking mechanism 80 may also include self-locking of the closure unit 30. The opening arm 32 is arch-shaped, whereby a drive-side bearing of the opening arm 32 is offset, in particular above, to a cover-side bearing. When adjusting the opening arm 32 from an opening state I to the locking state II, it is particularly intended that the opening arm 32 is adjusted beyond a dead center. This can be achieved, for example, by means of a closure gear, which has an eccentric, in particular wherein the arc-shaped opening arm 32 is mounted on the eccentric. If an attempt is then made from outside to open the lid element 31, the opening arm 32 has a self-locking effect. In addition or alternatively, it may be provided that the locking gear is self-locking, e.g. by the locking gear comprising a worm gear. A guiding means 71 of the external housing 70 is also provided, which during the pivoting movement for opening the lid element 31 secures the first external housing part 70.1 relative to the lid element 31 by means of a counter-guide means 34 in such a way that the first external housing part 70.1 is not removable when the lid element 31 is opened. Thus, this represents a safety function which prevents a user from accessing the identification device 2 even in an opening state I of container device 1. Thus, the guiding means 71 of the external housing 70 is formed in an arc-shaped manner, so that the counter-guide means 34 of the lid element 31 has a permanent positive connection with the guiding means 71 during the opening movement of the lid element 31. For mounting the first external housing part 70.1, the external housing 70 can be configured so that the first external housing part 70.1 is plugged in along a mounting direction 70.3. The first external housing part may have 70.1 latching means by which a positive locking with the housing 12 and/or with the second external housing part 70.2 can be achieved. In particular, when mounting the first external housing part 70.1, the guiding means 71 can cause a positive locking with the counter-guide 34. If the lid element 31 swivels, disassembly of the first external housing part 70.1 is therefore not possible, as the counter-guide 34 and the guiding means 71 block movement of the first external housing part 70.1. This ensures theft protection of the identification device 2 if it is inside the container device 1. In addition, an emergency locking system 72 is also provided, by means of which the external housing 70, in particular the first external housing part 70.1 and/or the second external housing part 70.2 are secured to the housing 12 of the key compartment 10. The emergency locking system 72 works preferably in the manner of a mousetrap. If an attempt is made to dismantle the external housing 70, the closure unit 30 shall preferably be locked in such a way that it is impossible or at least difficult to open the key compartment 10. In particular, the emergency locking system 72 is part of a locking mechanism 80 by which an anti-theft device of the container device 1 can be improved against unauthorized access to the identification device 2. FIG. 10 also shows an exemplary configuration of the emergency locking system 72.

Figure 2:
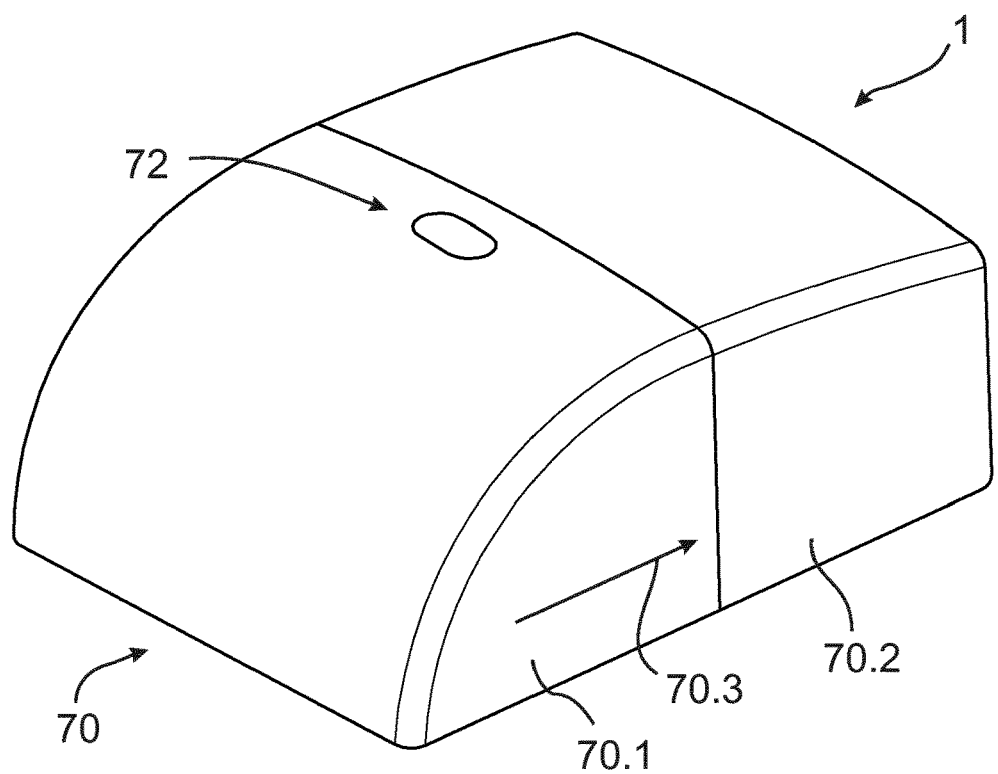

FIG. 2 also shows the external housing 70 of the container device 1 in a closed state, as would be visible to a user in the vehicle. In particular, the key compartment 10 is surrounded by the external housing from five sides, i.e. especially in five spatial directions. If the container device 1 is attached to a vehicle component 4 from the other side, access to the key compartment 10 may be prevented or further impeded.

Figure 3:
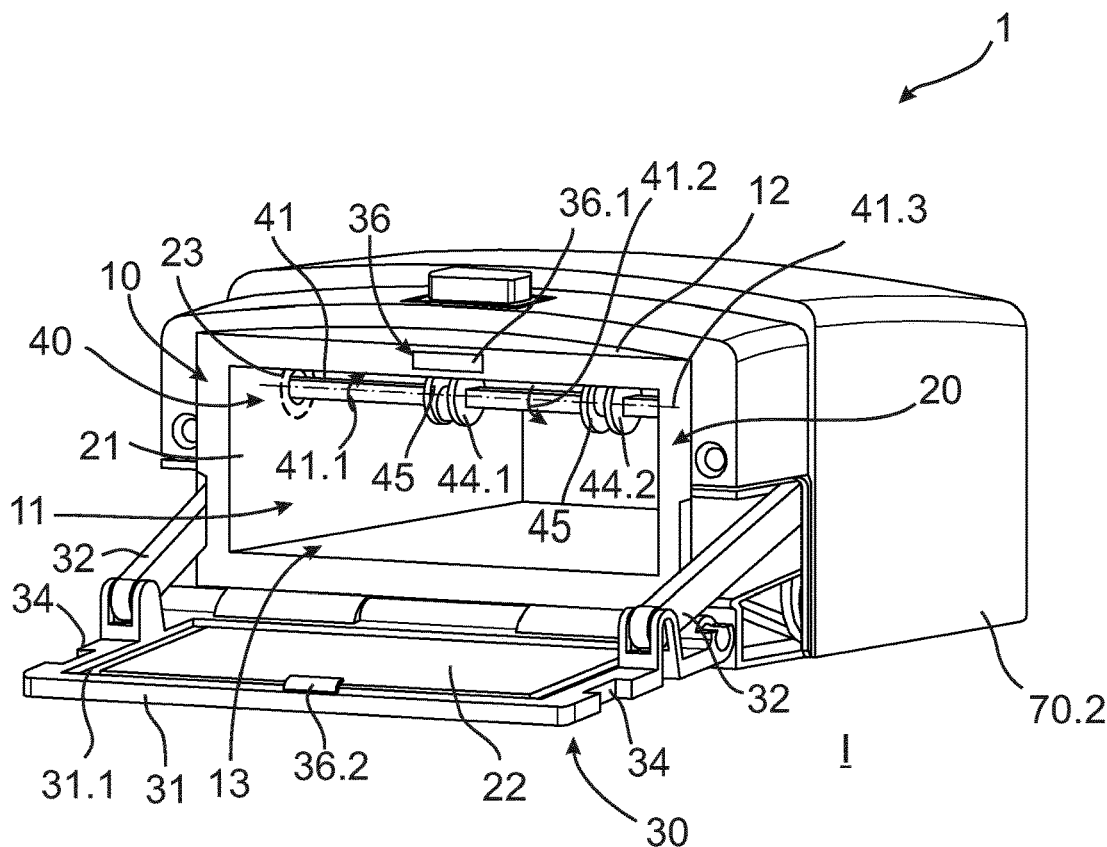

FIG. 3 shows the key compartment 10 of the container device 1 of the first embodiment in schematic perspective view, whereby the closure unit 30 is in an opening state I. Here the shielding unit 20 is shown, which has a lining 21 and a cover element 22. The lining 21 is configured as an insert in the housing 12 of the container device 1. In particular, the lining 21 is configured as a cast part, particularly preferably as a zinc die-cast part, comprising a zamak material. Here, however, various other configurations are conceivable, whereby, for example, the lining 21 can be provided as a metallic foil in the housing 12, as a metal textile or the like. The cover element 22 is arranged in particular as a metallic foil on the lid element 31. In addition or alternatively, however, it can be provided that the cover element 22 is configured integrally with the lid element 31. For example, the metallic foil can be welded to the lid element 31 or the lid element 31 can be completely made of metal. Advantageously, the inner surface of the lid element 31 can form a cover element 22. In particular, a Faraday cage is thus formed by the shielding unit 20 at least in the locking state II, so that the cavity 11 is shielded against wireless communication signals, in particular electromagnetic signals. In addition, a locking 36 of the locking mechanism 80 is provided, by means of which the lid element 31 can be locked to the key compartment 10. For this purpose, the lid element 31 has a first locking part 36.1 which, together with a second locking part 36.2, can prevent the closure unit 30 from being transferred from locking state II to opening state I. The first locking part 36.1 is equipped with a second locking part 36.2. In particular, the first locking part 36.1 can be configured as a bolt and the second locking part 36.2 as a groove in which the bolt can engage. Alternatively, however, further configurations are conceivable, in particular a reverse arrangement or a flap in which a bolt can engage. The housing 12 with the lining 21 of the shielding unit 20 also form the cavity 11 into which the identification device 2 can be inserted. Within cavity 11, at least part of an actuating mechanism 40 is provided for mechanically actuating control elements 2.1, 2.2 of identification device 2. A rotary element 41 of the actuating mechanism 40 is the only element of the actuating mechanism 40 that projects into the cavity 11 from the outside. The rotary element 41 is rotatably mounted on a rotary axis 41.3, so that the mechanical actuation of the identification device 2 can be realized by a rotation of the rotation element 41 in a first and/or second direction of rotation 41.2, 41.2. In order to ensure complete shielding of the cavity 11 against electromagnetic signals, the shielding unit 20 also has a guide 23 which rotatably supports or guides the rotary element 41 of the actuating mechanism 40. Preferably, the guide 23 can be configured as ball bearing (here schematically shown). Such ball bearings can, for example, be configured as double ball bearings and/or double-secured ball bearings in order to implement shielding as reliably as possible. Furthermore, the guide 23 is thus reliable and low-wear. The rotary element 41 is configured as a polygonal shaft, in particular as a square shaft. This allows a first and a second control bodies 44.1, 44.2, their function in the following, especially in the FIGS. 7a and 7b, can be positively driven in the direction of rotation by the rotary element 41. At the same time, the control bodies 44.1, 44.2 can still be moved on the rotary element 41 in an axial direction, i.e. along the rotary axis 41.3, in order to adapt their position as flexibly as possible to the respective model of the identification device 2.

Figure 4:
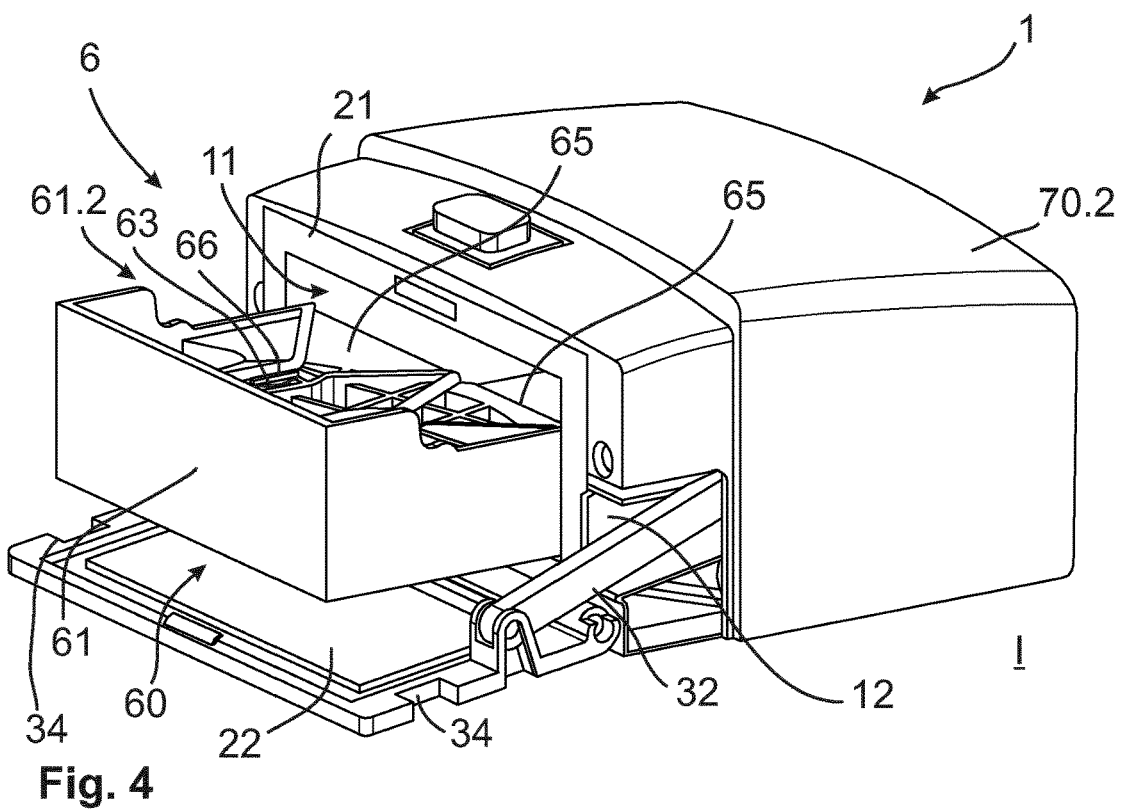
Figure 5A:
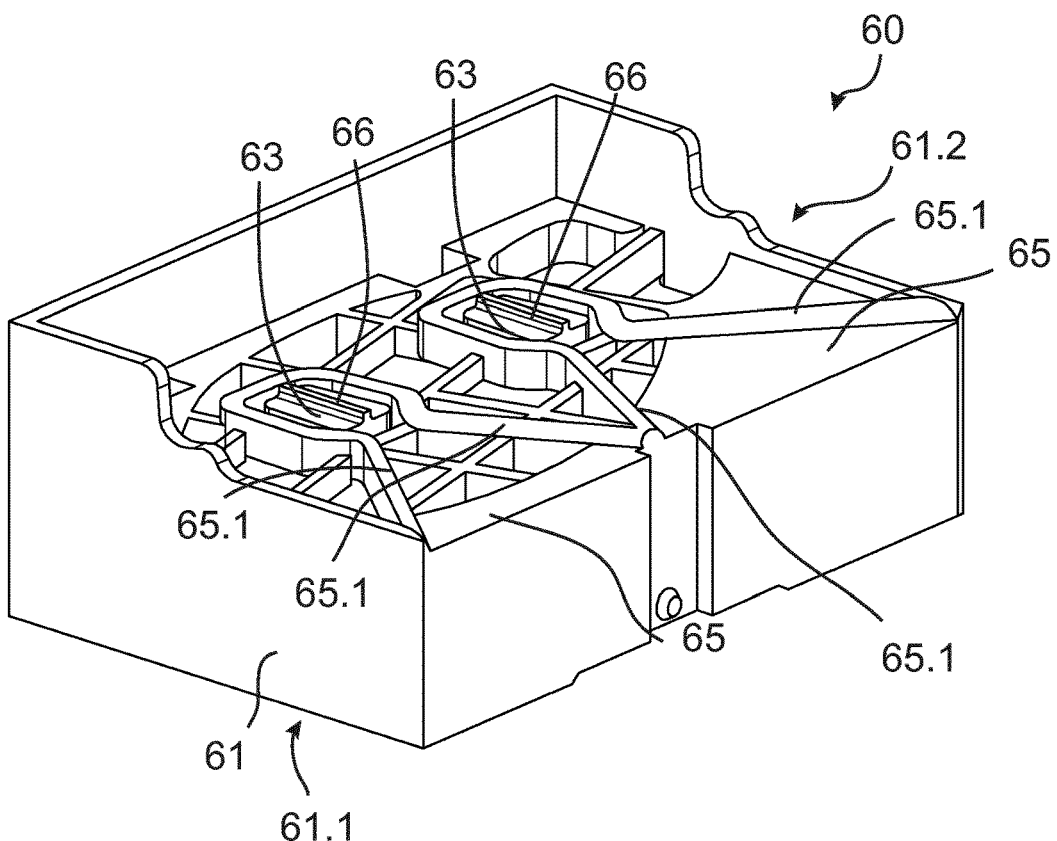
Figure 5B:
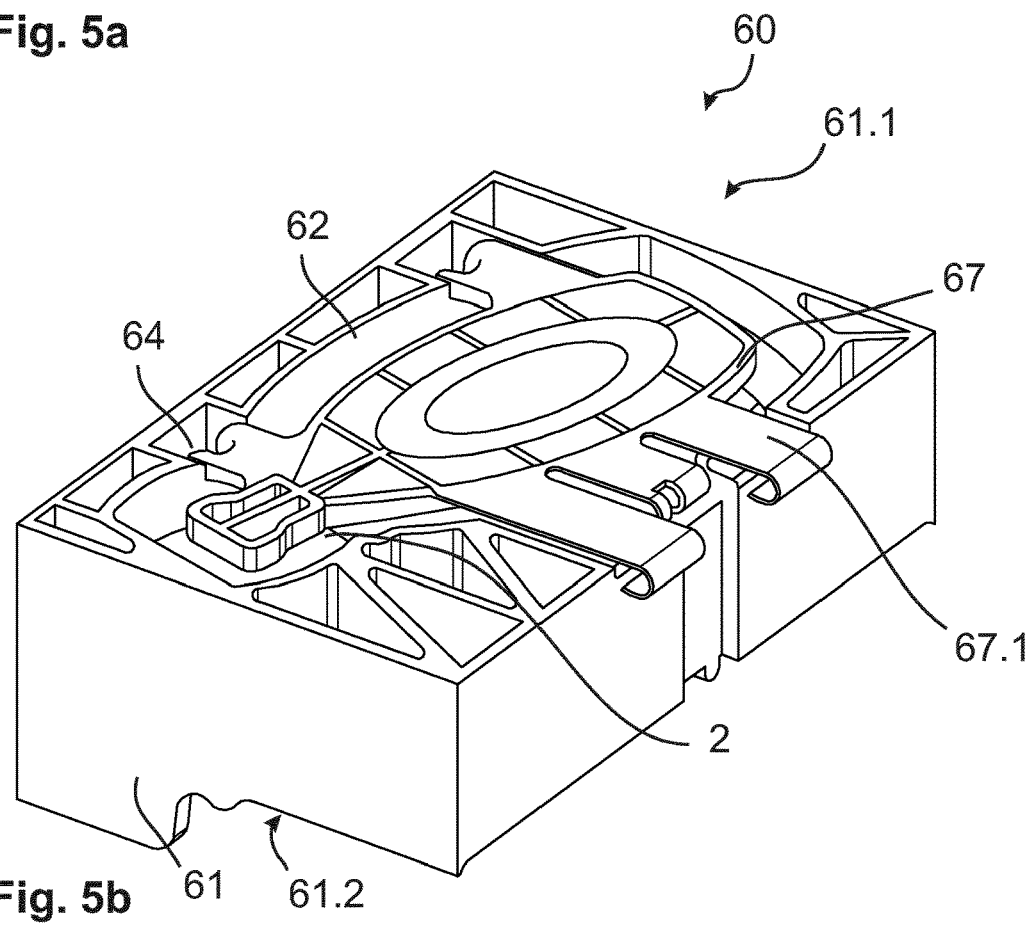

FIG. 4 shows a corresponding insert 60, which can be inserted into the container device 1 of the embodiment in order to arrange the identification device 2 positively in the cavity 11. The insert 60 is also shown separately in the FIGS. 5a to 5c in perspective partial view, where FIG. 5b shows insert 60 with a first side 61.1 and FIG. 5a shows insert 60 with a second side 61.2. Insert 60 has a receptacle 61, which forms a key receptacle 62. The key receptacle 62 is configured as a recess in the first side 61.1 of the receptacle 61. identification device 2 can be stored in the key receptacle 62 in a form-fitting manner, for which purpose a securing element 67 is also provided on the first side 61.1, by means of which an identification device 2 can be fixed in a key receptacle 62. The securing element 67 can be configured integrally with the receptacle 61 and can, for example, be hinged to the receptacle 61 via a film hinge. Alternatively, it is conceivable that the securing element 67, for example, is configured as a separate component. In particular, the securing element 67 can also be closed by means of a latching closure 67.1. The key receptacle 62 also has an insertion aid 64, which comprises a negative contour of the identification device 2 so that it can be inserted as precisely as possible into the key receptacle 62. In particular, the insertion aid 64 ensures that the identification device 2 is oriented in a maximum of two positions, preferably in only one position, in the key receptacle 62, i.e. misalignment is not possible or quickly noticeable during assembly. If the insertion aid 64 follows the contour of the identification device 2, it is already ensured that it can only be arranged in two positions (upper side upwards or lower side upwards) in the key receptacle 62. In addition, the insertion aid 64 can take a shape and/or special features of the identification device 2 into account, so that only one position can be occupied by the identification device 2 in the key receptacle 62. For example, a groove can be provided for a prominent logo or another configuration and/or functional element. Furthermore, for example, an incline can be provided in which a groove of the identification device 2 engages. In particular, the insertion aid 64 may have a pin over which a preferably eccentric key ring receptacle of the identification device 2 can be fitted, thus preventing misalignment of the identification device 2. The second side 61.2 of insert 60 also has two inlet paths 65, which are funnel-shaped. In addition, the inlet paths 65 have inlet walls 65.1, in particular which are arranged diagonally to each other. The inlet paths 65 ensure that the control bodies 44.1, 44.2 of the actuating mechanism 40 of the container device 1 are correctly positioned when inserting the insert 60 into the cavity 11 of the container device 1. When inserting the insert 60, the control bodies 44.1, 44.2 can, if they are not correctly positioned, hit against one of the inlet walls 65.1 of the inlet path 65 and align themselves accordingly movably on the rotary element 41 of the actuating mechanism 40 in such a way that they follow the respective funnel-shaped inlet path 65. Accordingly, the control bodies 44.1, 44.2 can each be positioned over an actuating means 63 of the insert 60. The actuating means 63 are configured as plungers which can be pushed down by the respective control bodies 44.1, 44.2. For this purpose, each actuating means 63 has a rail element 66 which can be brought into operative connection with the first and/or second control bodies 44.1, 44.2.

Figure 5C:
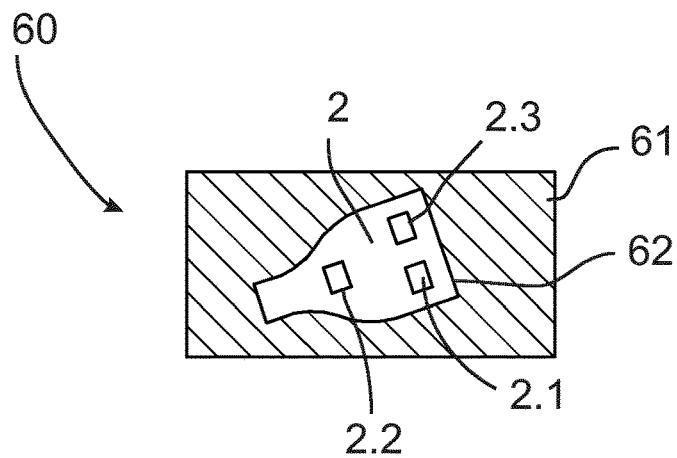
Figure 7A:
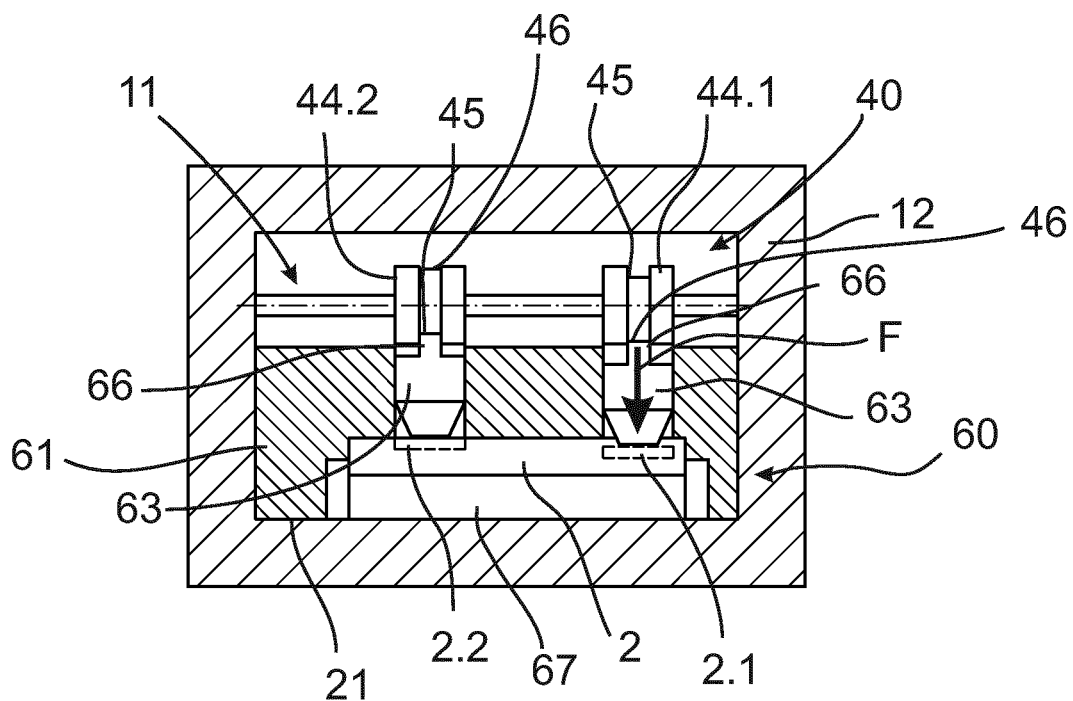
Figure 7B:
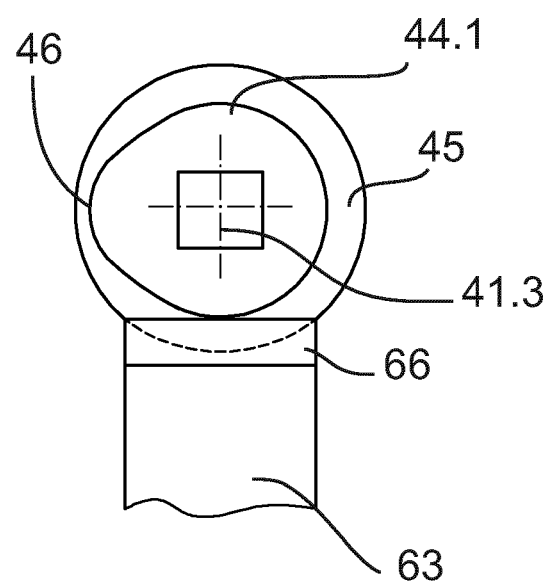

Like in the FIGS. 7a and 7b or is shown in FIG. 3, each control body 44.1, 44.2 has a recess 45 in which the rail element 66 of the actuating means 63 can be positioned. FIG. 7a shows the actuating mechanism 40 within the container device 1 with inserted insert 60 in a schematic, partly cut view and FIG. 7b the first control body 44.1 in a schematic side view. If the rotary element 41 of the actuating mechanism 40 rotates, the first and/or second control body 44.1, 44.2 is moved in a first direction of rotation 41.1 or a second direction of rotation 41.2 according to the direction of rotation 41.1, 41.2 of the rotating body 41. A control contour 46 of the respective control body 44.1, 44.2 runs along the rail element 66. The control contour 46 is eccentric, in particular the control contour 46 has a cam section. Due to the eccentricity of the control contour 46, the actuating means 63 is thus pressed down and mechanically actuates a first and/or second control element 2.1, 2.2. FIG. 5c shows the insert 60 in a cut representation, where the identification device 2 is inserted in the insert 60 and the control bodies 44.1, 44.2 each operate with one of the control elements 2.1, 2.2. Preferably, identification device 2 may have an additional control element 2.3 which, in particular, does not provide a vehicle function relevant for car sharing. Thus the control bodies 44.1, 44.2 exert an actuating force F on at least one of the control elements 2.1, 2.2 of the identification device 2 when the rotary element 41 is rotated. The control bodies 44.1, 44.2 are further arranged relative to each other on the rotary element 41 in such a way that when the rotary element 41 rotates in the first direction of rotation 41.1 one of the control bodies 44.1, 44.2 actuates the actuating means 63 and when the rotary element 41 rotates in the second direction of rotation 41.2 the respective other control body 44.2, 44.1 actuates the respective other actuating means 63, so that e.g. with rotation in the first direction of rotation 41.1 the first control element 2.1 of the identification device 2 can be actuated mechanically and with rotation in the second direction of rotation 41.2 the second control element 2.2 can be actuated. Preferably the receptacle 61 of the insert 60 can be made of plastic and/or foam. In particular, the receptacle 61 may be configured as a deep-drawn part.

Figure 6:
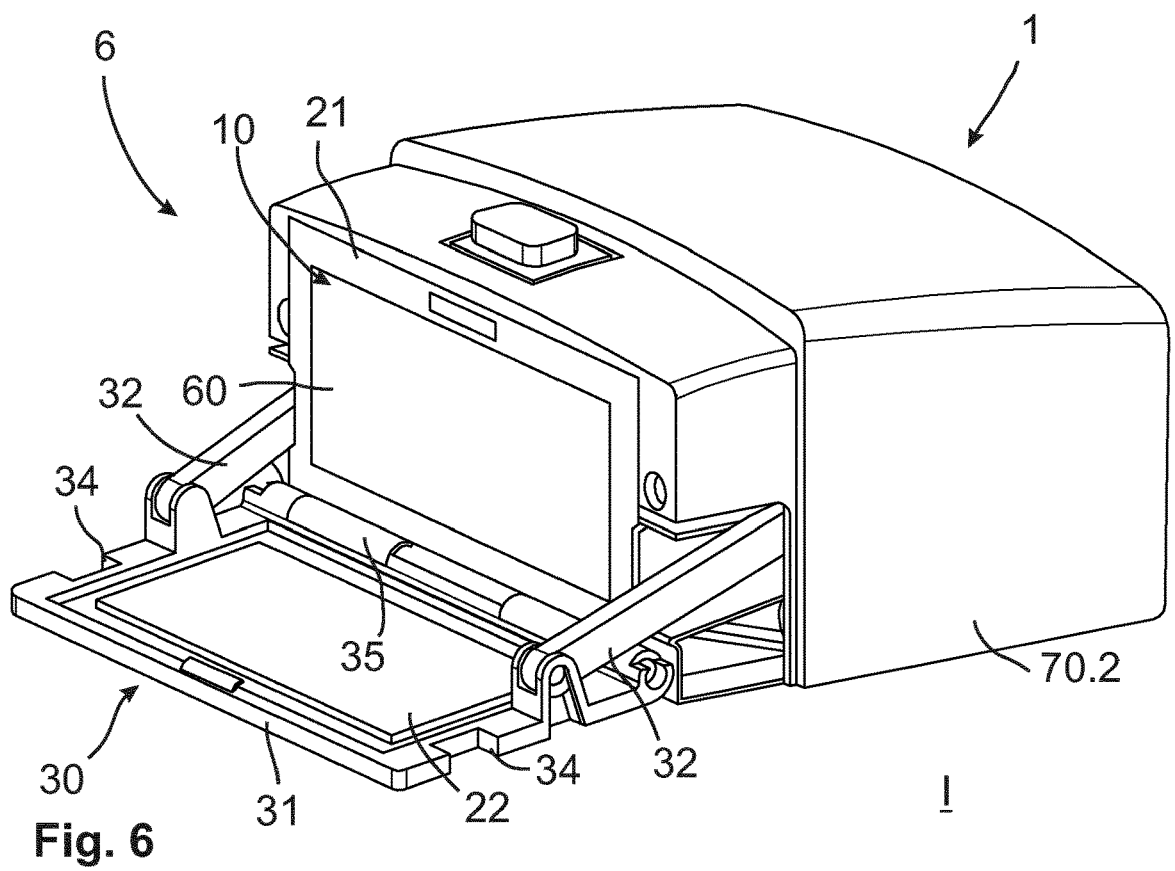

FIG. 6 also shows a schematic partial view of a container system 6 according to the invention. The container device 1 is arranged with the insert 60, so that the identification device 2 is positively arranged in the cavity 11 of the key compartment 10. As shown in FIG. 6, the closure unit 30 is in the opening state I, whereby wireless data communication of the identification device 2 is not prevented by the shielding unit 20.

Figure 8:
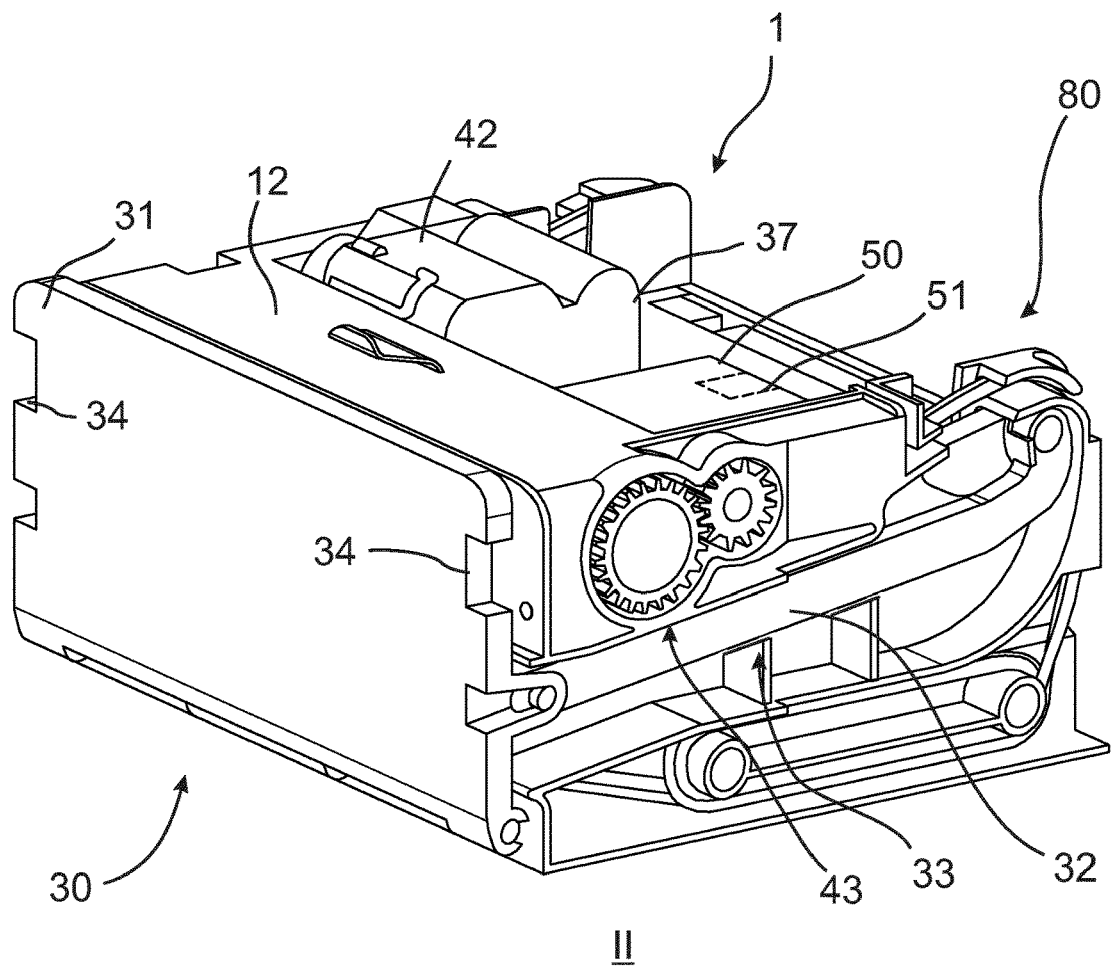

FIG. 8 further shows a partial view of the actuator 1, the closure unit 30 being shown in a locking state II. This prevents wireless data communication from identification device 2, which is located inside key compartment 10. In addition, FIG. 8 shows that the opening arm 32 is mounted in a guide 33 of the housing 12 so that a reliable adjustment of the lid element 31 of the closure unit 30 can be guaranteed. In addition, a transmission 43 of the actuating mechanism 40 is shown, through which a drive movement of an actuating drive 42 can be transmitted to the rotary element 41. The transmission 43 is preferably arranged outside the cavity 11, so that only the rotary element extends into the cavity 11. In addition, a locking drive 37 is shown by means of which the closure unit 30 can be adjusted. Preferably, the locking drive 37 and the actuating drive 42 can be coupled structurally and/or functionally. The locking drive 37 and/or the actuating drive 42 may also have an electric motor. In addition, an electronic unit 50 is shown, which has a communication interface 51. The electronic unit 50 is preferably in communication connection with the closure unit 30 and/or the actuating mechanism 40, so that these can be activated by the electronic unit 50. Via the communication interface 51, for example, a data connection can be established with a mobile device 52 of the user, so that the user can authenticate himself to the electronic unit 50. The communication interface 51 preferably includes a Bluetooth interface, a WLAN interface, a ZigBee interface, an NFC interface, a mobile radio interface or the like. In addition or alternatively, it is conceivable that the communication interface 51 comprises a cable which can be led to the outside of the vehicle 3. In particular, the communication interface 51 may have a mobile radio interface. This means that the user can be authenticated e.g. by means of the mobile device 52, via the Internet and/or via mobile radio on the electronic unit 50. An external server 5, with which the user can communicate via the mobile device 52 in particular, can be provided as an advantage. If the server 5 detects a positive authentication of the user, it can be provided that the server 5 controls the container device 1 via the communication interface 51 or sends a corresponding release and/or control signal to the electronic unit 50 of the container device 1. In particular, the external server 5 can be part of the container system 6.

Figure 9:
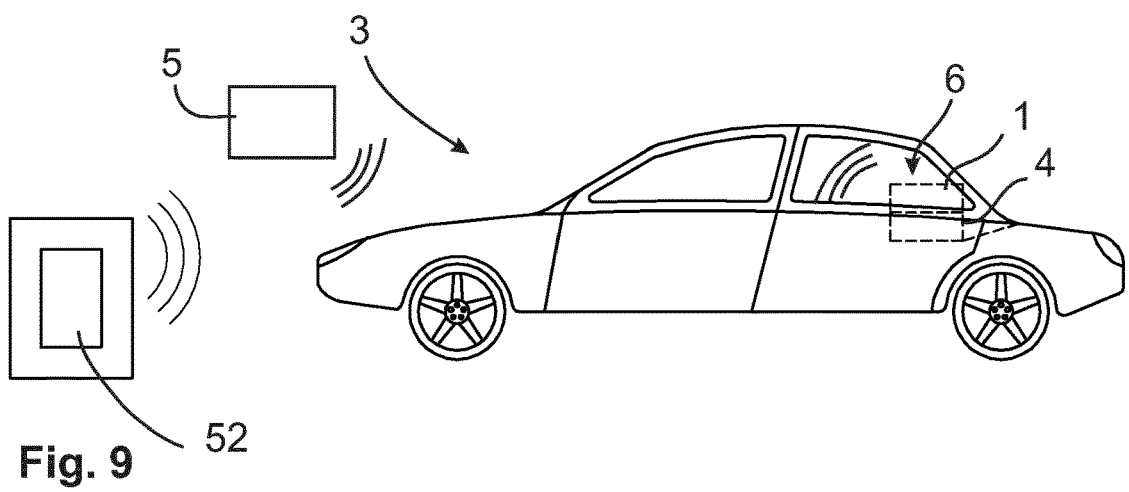

FIG. 9 also shows a diagram of a vehicle 3. A container system 6 with a container device 1 is arranged on a vehicle component 4. An identification device 2, which in particular comprises an electronic vehicle key for the vehicle 3, can be arranged in the container device 1 by means of an insert 60. The container device 1 is preferably located near the rear window of the vehicle, so that the driver's field of vision is not or only slightly affected and at the same time a wireless communication connection with the surroundings of the vehicle, in particular with a mobile device 52 of the user of the vehicle 3, is possible. The mobile device 52 can be, for example, a tablet or a mobile phone, especially a smartphone. Furthermore, it may be provided that the user communicates with a server 5 via the mobile device 52, whereby the server 5, upon successful authentication of the user, can control the container device 1, i.e. e.g. send an enable signal to the container device 1. In addition, vehicle component 4 may include, for example, a part of a vehicle body on which the container device 1 or the container system 6 may be mounted in a particularly safe manner. Preferably the container device 1 can be configured according to the first embodiment.

Thus, it is possible to use a standard identification device 2 for vehicle 3 without making it available to the user or making it available to the user only for a limited period of time and at the same time offering a safe storage possibility, especially independent of vehicle 3. This has the advantage that the user cannot inadvertently or intentionally steal or lose the identification device 2 and at the same time a burglary protection is improved if the identification device 2 is stored in the container device 1. For example, the user may be provided with an access code, independent of the vehicle 3, with which he can authenticate himself to the container device 1, so that the electronic unit 50 controls the actuating mechanism 40 and/or the locking mechanism 80 and/or the closure unit 30. It is thus possible to store the identification device 2 in the container device 1, whereby in a locking state II of the container device 1 no radio signals of the identification device 2 can penetrate to the outside or radio signals from the outside can reach the identification device 2 in the cavity 11. In an opening state I, it is possible for communication signals from the container device 1 to reach the outside and/or from the outside into the cavity 11 and/or to remove the identification device 2. This can trigger a vehicle function. In particular, identification device 2 can thus authenticate itself to the vehicle electronics and thus grant the user admission, for example, if the locking system of vehicle 3 is operated. In particular, the actuating mechanism 40 of container device 1 can also ensure that identification device which are to be mechanically actuated can be actuated automatically. For this purpose an individualized insert 60 can be provided, which is adapted to the identification device 2. All other components of the container device 1 can therefore be suitable for different vehicle types. Preferably, this means that only one mold tool can be adapted to the respective vehicle type in order to produce insert 60.

FIG. 10 further schematically shows a possible configuration of an emergency locking system 72 of a container device 1, wherein a main locking element 73 secures a closure unit 30 of the container device 1. A secondary locking element 74 is also provided, which is suitable for securing the main locking element 73. The secondary locking element 74 is thereby pretensioned against a securing section 74.2 by a biasing means 74.1, preferably a spring. The securing section 74.2 can, for example, be configured as a sheet metal projection of the external housing 70. In normal operation of the container device 1, the main locking element 73 can be moved along a direction of movement 73.2, so that the closure unit 30 can be locked, e.g. against opening a lid element 31 relative to a key compartment 10, in particular a housing 12 of the key compartment 10, of the container device 1, or the opening can be unlocked by unlocking the main locking element 73. If the external housing 70 is removed without authorization, the securing section 74.2 is automatically released at the same time so that the secondary locking element 74 is released. The biasing means 74.1 ensures that the secondary locking element 74 moves in the direction of the main locking element 73 and engages in a groove 73.1 of the main locking element 73 (dashed illustration). This enables or at least makes it considerably more difficult to move the main locking element 73 if the external housing 70 is removed by unauthorized persons. This, in turn, prevents the closure unit 30 from being unlocked, in particular by positive locking. In particular, this improves the security of container device 1 against unauthorized removal of identification device 2 from cavity 11 by the emergency locking system 72.

Figure 11:
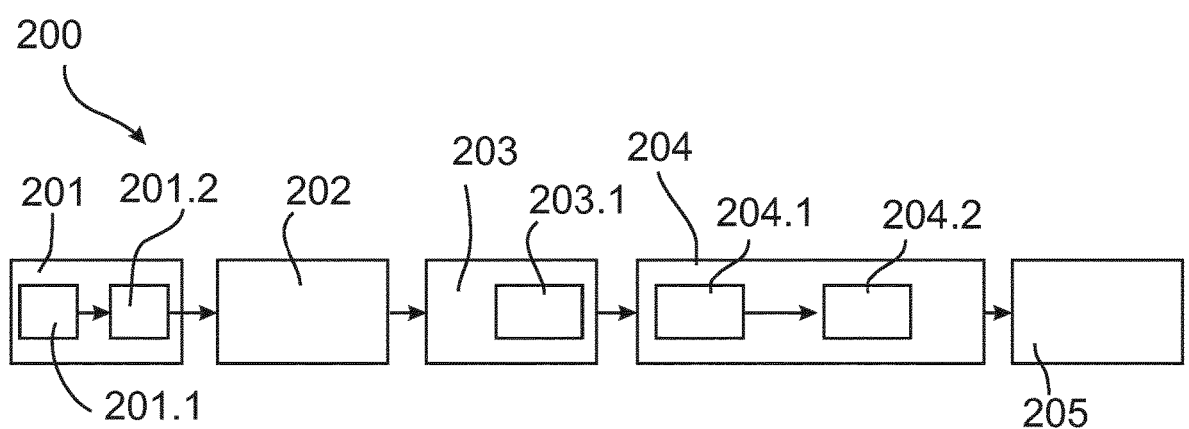

FIG. 11 also shows a method 200 according to the invention for triggering a vehicle function of a vehicle 3 by an identification device 2. The identification device 2 is meanwhile stored in a container device 1, which can in particular be configured according to one of the previous embodiments. It is provided that for the storage 201 of the identification device, an insertion 201.1 of the identification device 2 in an insert 60 is performed, in particular so that the identification device 2 is positively fixed in a key receptacle 62 of the insert 60. The insert 60 can then be placed in the cavity 11 in the container device 1 by insertion 201.2, preferably insertion, so that the identification device 2 is securely fixed in the container device even when the vehicle is moving. If a vehicle function is now required, a drive 203 with a rotation 203.1 a rotary element 41 of an actuating mechanism 40 of the container device 1 in a first direction of rotation 41.1. In particular, rotation 203.1 includes driving the rotary element 41 via a transmission 43, so that a power transmission can be adapted and also a speed. The drive 203 can preferably be performed automatically by an electric motor. Then an actuation 204 of a first control element 2.1 of the identification device 2 is performed. Actuating 204 of the control element 2.1 can preferably include actuating 204.1 of a first actuating means 43, in which a control body 44 acts on the first actuating means 43. In particular, the first control element 2.1 is then actuated 204.2 by the first control element 63 acting on the first control element 2.1. In particular, the actuating means 63 may be part of the insert 60. This enable a rotary movement to convert into a linear movement, whereby the identification device 2 can have any shape as a standard identification device due to the insert 60, whereby the container device 1 can be reused at the same time and the insert 60 can be adapted to different shapes of identification device or different inserts 60 can be used. An opening 202 of the container device 1 can be provided before the control element 2.1 is actuated 204, in particular before the operating mechanism 40 is driven 203, so that wireless data communication of the identification device 2 with the vehicle 3 is not prevented by shielding. Subsequently, in particular after a predefined time interval, the container device is preferably closed 205 in order to restore the shielding around the identification device 2 and to prevent wireless data communication of the identification device 2 with the vehicle 3.

The preceding explanation of the forms of embodiments describes the present invention exclusively in the context of embodiments. Of course, individual features of the embodiments can be freely combined with each other, if technically reasonable, without leaving the scope of the present invention.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

REFERENCE CHARACTER LIST 1 container device
2 identification device
2.1 first control element
2.2 second control element
2.3 additional control element
3 vehicle
4 vehicle component
5 external server
6 container system
10 key compartment
11 cavity
12 housing
13 opening
20 shielding unit
21 lining
22 cover element
23 guide
30 closure unit
31 lid element
31.1 groove
32 opening arm
33 guide
34 counter-guide means
35 swivel joint
36 locking
36.1 first locking part
36.2 second locking part
37 locking drive
40 actuating mechanism
41 rotary element
41.1 first direction of rotation
41.2 second direction of rotation
41.3 rotary axis
42 actuating drive
43 transmission
44.1 first control body
44.2 second control body
45 recess
46 control contour
50 electronic unit
51 communication interface
52 mobile device
60 insert
61 receptacle
61.1 first side
61.2 second side
62 key receptacle
63 actuating means
64 insertion aid
65 inlet path
65.1 inlet wall
66 rail element
67 securing element
67.1 latching closure
70 external housing
70.1 first outer housing part
70.2 second outer housing part
70.3 mounting direction
71 guiding means
72 emergency locking system
73 main locking element
73.1 groove
73.2 direction of movement
74 secondary locking element
74.1 biasing means
74.2 securing section
80 locking mechanism
200 method step
201 method step
201.1 method step
201.2 method step
202 method step
203 method step
203.1 method step
204 method step
204.1 method step
204.2 process step
205 method step
I opening state
II locking state
F actuating force

What is claimed is:

1. A container device (1) for storing an identification device (2) in a vehicle (3), comprising:
a key compartment (10) having a cavity (11) in which the identification device (2) is storable:
that an actuating mechanism (40), via which an actuation of a first control element (2.1) of the identification device (2) is effected, the actuating mechanism (40) having a rotary element (41) which is rotatably mounted, and the actuation of the first control element (2.1) being executable by a rotation of the rotary element (41):
at least a first control body (44.1) arranged on the rotary element (41); and
at least a second control body (44.2) configured to execute an actuation of a second control, element (2.2) of the identification device (2),
with the first control element (2.1) being actuatable by the first control body (44.1), when the rotary element (41) rotates in a first direction of rotation (41.1), and the second control element (2.2) being actuatable by the second control body (44.2), when the rotary element (41) rotates in a second direction of rotation (41.2).

2. The container device (1) according to claim 1, wherein the rotary element (41) is at least one of arranged at least partially in the cavity (11) and projects into the cavity (11).

3. The container device (1) according to claim 1, wherein the first control body (44.1) is formed integrally with the rotary element (41).

4. The container device (1) according to claim 1, wherein the first control body (44.1) is arranged on the rotary element

(41) so as to be axially displaceable along a rotary axis (41.3) of the rotary element (41).

5. The container device (1) according to claim 1, wherein the first control body (44.1) forms a positive connection with the rotary element (41) in such a way that a torque can be transmitted from the rotary element (41) to the first control body (44.1).

6. The container device (1) according to claim 1, wherein the first control body (44.1) has, at least in regions, a recess (45) through which a position of the first control body (44.1) on the rotary element (41) is fixable in a positive-locking manner with a rail element (66), such that an eccentric course of the recess (45) forms a control contour (46) for actuating the first control element (2.1).

7. The container device (1) according to claim 1, wherein the actuating mechanism (40) is configured such that only the one rotary element (41) extends from an outside thereof into the cavity (11).

8. The container device (1) according to claim 1, further comprising an actuating drive (42), via which the rotary element (41) is drivable.

9. The container device (1) according to claim 1, further comprising a transmission (43) disposed between the actuating drive (42) and the rotary element (41).

10. The container device (1) according to claim 1, wherein the key compartment (10) is configured such that the identification device (2) can be positively received in the cavity (11).

11. An insert (60) for storing an identification device (2) in a cavity (11) of a container device (1) including
a key compartment (10) having the cavity (11) in which the identification device (2) is storable, an actuating mechanism (40) via which an actuation of a first control element (2.1) of the identification device (2) is effected, the actuating mechanism (40) having a rotary element (41) which is rotatably mounted, and the actuation of the first control element (2.1) being executable by a rotation of the rotary element (41), at least a first control body (44.1) arranged on the rotary element (41), and at least a second control body (44.2) configured to execute an actuation of a second control element (2.2) of the identification device (2), with the first control, element (2.1) being actuatable by the first control body (44.1), when the rotary element (41) rotates in a first direction of rotation (41.1), and the second control element (2.2) being actuatable by the second control body (44.2), when the rotary element (41) rotates in a second direction of rotation (41.2),
said insert (60) comprising:
a receptacle (61) which forms a key receptacle (62) in which the identification device (2) is storable, the receptacle (61) being arrangeable in the cavity (11) and having at least one actuating means (63) which, when the receptacle (61) is arranged in the cavity (11), can be brought into operative connection with the actuating mechanism (40) of the container device (1), so that, when the actuating mechanism (40) is activated, an actuating force (F) can be exerted by the actuating means (63) on the at least first control element (2.1) of the identification device (2).

12. The insert (60) according to claim 11, wherein the actuating means (63) and the key receptacle (62) are formed integrally, or the actuating means (63) and the key receptacle (62) are designed configured at least in two parts.

13. The insert (60) according to claim 11, wherein the actuating means (63) is configured such that the actuating force (F) can be exerted linearly or substantially linearly on the first control element (2.1).

14. The insert (60) according to claim 11, wherein the key receptacle (62) has at least one insertion aid (64) which ensures orientation of the identification device (2) in a maximum of two positions in the key receptacle (62).

15. The insert (60) according to claim 11, wherein the identification device (2) can be inserted into the key receptacle (62) from a first side (61.1) of the receptacle (61), and the actuating force (F) can be exerted on at least one of the actuating means (63) and the first control element (2.1) from a second side (61.2) of the receptacle (61).

16. The insert (60) according to claim 11, wherein the receptacle (61) has, on the first side (61.1), a securing element (67) via which the identification device (2) is fixable in the key receptacle (62), with the securing element (67) having a latching closure (67.1).

17. The insert (60) according to claim 11, wherein the insert (60) has at least one inlet path (65) via which the first control body (44.1) of the actuating mechanism (40) and the insert (60) can be aligned with one another, with the inlet path (65) having a funnel-shaped configuration.

18. The insert (60) according to claim 11, wherein the actuating means (63) has a rail element (66) which can be brought into operative connection with the actuating mechanism (40) of the container device (1), including the first control body (44.1), in a positive-locking manner.

19. A container system (6) comprising a container device (1) for storing an identification device (2) in a vehicle (3), having a key compartment (10) having a cavity (11) in which the identification device (2) can be stored, said container device (1) including an actuating mechanism (40), via which an actuation of at least one first control element (2.1) of the identification device (2) can be carried out, and an insert (60) according to claim 11.

20. A method (200) for actuating an identification device (2) for a vehicle (3), the identification device (2) being stored meanwhile at least temporarily in a container device (1) including
a key compartment (10) having the cavity (11) in which the identification device (2) is storable, an actuating mechanism (40) via which an actuation of a first control element (2.1) of the identification device (2) is effected, the actuating mechanism (40) having a rotary element (41) which is rotatably mounted, and the actuation of the first control element (2.1) being executable by a rotation of the rotary element (41), at least a first control body (44.1) arranged on the rotary element (41), and at least a second control body (44.2) configured to execute an actuation of a second control element (2.2) of the identification device (2), with the first control element (2.1) being actuatable by the first control body (44.1), when the rotary element (41) rotates in a first direction of rotation (41.1), and the second control element (2.2) being actuatable by the second control body (44.2), when the rotary element (41) rotates in a second direction of rotation (41.2),
said method comprising the following steps:
driving (203) the actuating mechanism (40) of the container device (1),
actuating (204) the first control element (2.1) of the identification device (2) as a result of driving (203) the actuating mechanism (40), with a wireless communication signal of the identification device (2) being triggered.

21. The method (200) according to claim 20, wherein the driving (203) of the actuating mechanism (40) includes rotating (203.1) the rotary element (41) of the actuating mechanism (40) in the first direction of rotation (41.1).

22. The method (200) according to claim 20, wherein the rotary element (41) is driven via a transmission (43).

23. The method (200) according to claim 20, wherein the rotation (203.1) of the rotary element (41) causes the first control body (44.1) to rotate, and the actuation (204) of the first control element (2.1) further comprises the following steps:
 actuating (204.1) a first actuating means (63) by the first control body (44.1) acting on the first actuating means (63),
 actuating (204.2) the first control element (2.1) by the first actuating means (63) acting on the first control element (2.1).

24. The method (200) according to claim 1, further comprising the following steps:
 removing a shielding against wireless data communication of the identification device (2) with the vehicle (3) by at least one of opening (202) the container device (1) and closing (205) the container device (1).

25. The method (200) according to claim 20, further comprising the following steps to retain the identification device:
 inserting (201.1) the identification device (2) into an insert (60), so that the identification device (2) is fixed in a positive-locking manner in a key receptacle (62) of the insert (60), and
 inserting (201.2), by pushing, the insert (60) into a cavity (11) of the container device (1).

26. The method (200) according to claim 25, wherein the insertion (201.1) of the identification device (2) into the insert (60) includes locking the key receptacle (62) via a securing element (67).

27. The method (200) according to claim 25, wherein, when the insert (60) is inserted (202) into the cavity (11), at least the first control body (44.1) is automatically positioned along the rotary element (41) to the first control element (2.1).

28. The insert (60) according to claim 14, wherein the insertion aid (64) ensures orientation of the identification device (2) in one position in the key receptacle (62).

* * * * *